Patented Nov. 20, 1951

2,575,350

UNITED STATES PATENT OFFICE 2,575,350

OZONIZATION OF ADDUCTS OF DEHYDRO-ERGOSTERYL ESTERS

Robert H. Levin, Kalamazoo, Mich., assignor to The Upjohn Company, Kalamazoo, Mich., a corporation of Michigan No Drawing. Application December 4, 1948, Serial No. 63,613

11 Claims. (Cl. 260—239.55)

This invention relates to dienophilic adducts of 3-acyloxy-bisnor-5,7,9-cholatrienic acids and esters thereof and to methods for their preparation.

The adducts of this invention may be represented by the general formula:

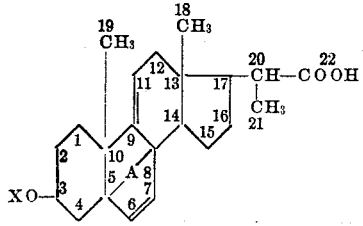

in which X is a member of the group consisting of hydrogen and acyl radicals and A is an adduct radical or bridge between the two carbon atoms in positions 5 and 8, derived from a dienophile of the group consisting of aliphatic 1,2-olefinic-1,2-dicarboxylic acids, esters and anhydrides of such acids. Such compounds are prepared, in accordance with the process of this invention, by selective oxidation of an adduct of an ester of dehydroergosterol having the following general formula, in which the symbols have the same significance as hereinbefore:

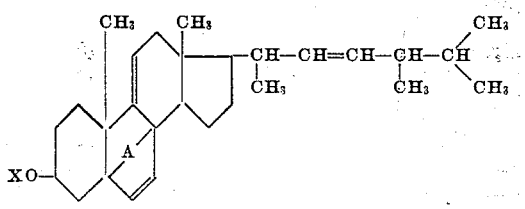

The 1,4 addition of a class of substances known as dienophiles to a conjugated system of double bonds is well known in the art, being designated as the Diels-Alder reaction. The addition products of this reaction are known generically as adducts. It is known that the double bonds present in a conjugated diene may be protected from many chemical reactions by the formation of such an adduct. It is also known that in a conjugated triene, only two of the double bonds may be protected by the formation of an adduct, the third double bond retaining its original activity. Likewise unsaturated carbon linkages remote from the adduct do not have their chemical reactivity affected.

It is an object of this invention to provide a method by which one of the two unprotected double bonds in an adduct of an ester of dehydroergosterol may be ozonized. It is an additional object of this invention to provide a means by which an adduct of an ester of dehydroergosterol may be oxidized to an acid by cleavage of the double bond between carbon atoms 22 and 23 without oxidation of the unprotected double bond between carbon atoms 9 and 11. Other objects and advantages of this invention will be apparent to those skilled in the art to which the invention pertains.

The products of this invention are useful as starting materials for the synthesis of bisnorcholadienic acid adducts having oxygen in the "C" ring (containing carbon atoms 8, 9, 11, 12, 13 and 14), such as adducts of 3-acyloxy-9,11-oxido-bisnor-5,7-choladienic acids and others, as described and claimed in the copending application of Robert H. Levin, Serial 63,614, filed concurrently herewith.

The achievement of the selective ozonization of an adduct of an ester of dehydroergosterol is completely unexpected, since previous attempts failed to yield any product in which the cyclopentanoperhydrophenanthrene nucleus remained intact [Ann. 494, 118 (1932)].

The objects of this invention have been accomplished by the selective ozonization of adducts of esters of dehydroergosterol, in solution, with a small excess of ozone, at a temperature below approximately twenty degrees centigrade, decomposition of the ozonide under oxidizing conditions, and isolation of the product thus formed.

The compounds of this invention are colorless crystalline solids, insoluble in water, soluble in ether and halogenated paraffin hydrocarbons and moderately soluble in methanol, ethyl acetate and benzene. The acid anhydride adducts are readily converted to acid adducts by hydrolysis in the presence of alkali.

The esters of dehydroergosterol from which the starting adducts of this invention are obtained may be prepared by methods heretofore described [Ann. 465, 157 (1928)] from esters of ergosterol, for example, by transforming the maleic anhydride adduct of ergosterol with mercuric chloride to produce the adduct of dehydroergosterol acetate. The esterification of the hydroxyl is for the purpose of protecting it from chemical reaction, thus any ester not containing a substituent reactive toward ozone under the conditions of this invention is suitable for use. The esters of saturated aliphatic acids such as acetic, propionic, isovaleric, and hexoic, of cycloaliphatic acids such as cyclohexoic, or aromatic acids such as benzoic, and toluic acids and naphthoic acids are preferred. These esters are prepared from ergosterol and the acid, acid chloride or acid anhydride by conventional methods.

The dienophiles which may be used to form adducts useful in this invention are olefinic dibasic acids, their esters and anhydrides, which have a double bond located between two adjacent carboxyl groups. Among the dienophiles suitable for the present invention are maleic acid, maleic anhydride, bromomaleic anhydride, dimethyl fumarate, dimethyl maleate, diethyl maleate, citraconic anhydride, and mesaconic anhydride. The preferred dienophiles are maleic anhydride, maleic acid and its lower esters. The adducts of these dienophiles are readily prepared by heating, in benzene or xylene solution, an ester of dehydroergosterol and the dienophile, the addition taking place more readily with esters of dehydroergosterol than with many other dienic sterols.

The selective ozonization of an adduct of an ester of dehydroergosterol is accomplished by dissolving the adduct in a suitable solvent, cooling to below +20 degrees centigrade and passing ozone into the solution until about 1.25–2.5 moles of ozone per mole of adduct has been added.

The temperature of the solution should be kept below 25 degrees centigrade, preferably between a temperature of minus 30 and plus 20 degrees centigrade, during the addition of the ozone, although temperatures as low as minus 80 degrees centigrade are operative. The lower temperatures of the preferred range are readily obtained by cooling the solution of the adduct with a bath of solid carbon dioxide in acetone, although other methods of cooling may of course be used. If the temperature exceeds 25 degrees centigrade during any substantial period of the ozonization more extensive oxidation involving the 9,11-double bond may ensue and result in splitting of the nucleus or production of derivatives of 9,11-oxido-bisnor-5,7-choladienic acid.

The customary solvents used in the ozonization of steroid molecules, such as glacial acetic acid, chloroform, methylene dichloride, carbon tetrachloride and methyl alcohol, may be used. A preferred solvent for ozonization at low temperatures is one that remains fluid at the low temperatures. Thus carbon tetrachloride and chloroform and acetic acid are of value only at the higher temperature ranges specified herein. Preferred solvents, operative at all temperatures, are methylene dichloride and methyl alcohol.

The quantity of ozone passed into the solution of the adduct is critical. The use of excessive quantities of ozone, especially at temperatures much above 20 degrees centigrade, results in the ozonization of the 9-11, as well as the 22-23 double bond. This is avoided by using about 1.25 to 2.5 moles of ozone per mole of steroid adduct. Due to incomplete utilization of the ozone, the addition to the reaction zone of more than one mole is preferred. When four to six moles or more of ozone per mole of sterol adduct are used, the ozonization of the 9-11 double bond is complete, with the result that upon hydrolysis the 9-11 double bond is split and none of the desired product is formed.

As is conventional with ozonizations conducted in solvents other than glacial acetic acid, the solvent used for the ozonization is replaced by glacial acetic acid prior to further treatment of the ozonide. This is accomplished by adding glacial acetic acid to the ozonide solution and fractionating, under reduced pressure, to remove the original solvent, additional acetic acid being added when necessary. The ozonide in glacial acetic acid is then decomposed, and oxidized. This oxidation can be effected by addition of an oxidizing agent to the reaction mixture either during or after the decomposition of the ozonide and prior to the isolation of reaction products. For the decomposition and oxidation 30 percent hydrogen peroxide may be used according to heretofore known procedures. [Lee Irvin Smith and George F. Rouault, J. Am. Chem. Soc. 65, 748 (1943).] Alternatively, the ozonide can be decomposed by means of zinc dust and, after removal of the zinc, the desired oxidation accomplished by means of silver nitrate or chromic acid in glacial acetic acid at 20 degrees centigrade, the excess being destroyed by the use of sodium bisulfite. The resulting acid may then be recovered and isolated according to conventional procedures, for example, by pouring the acetic acid solution into water and removal of the product by filtration.

When the adduct which is ozonized contains an anhydride ring, a part of the reaction product may consist of the acid adduct, the acid anhydride ring having been opened by hydrolysis during the isolation of the product. In order to simplify the isolation of a pure product it is desirable to treat the first crude precipitate obtained with acetic anhydride to convert any of the acid adduct to the anhydride adduct. When the adduct that has been ozonized by the method of this invention is an acid or ester adduct, this precaution serves no useful purpose and may be omitted. The crude acid may be purified by conventional methods.

The esters of this invention have been described with particular reference to the methyl ester; other esters such as the ethyl, isopropyl, sec. butyl, hexyl, cyclohexyl, benzyl, phenyl, and lauryl may likewise be prepared and used for the same purposes as the methyl ester.

The following examples illustrate the process and products of the invention but are not to be construed as limiting.

*Example 1.—Maleic anhydride adduct of 3 (beta)-acetoxy-bisnor-5,7,9-cholatrienic acid*

Ten grams of the maleic anhydride adduct of dehydroergosteryl acetate was dissolved in twenty milliliters of methylene chloride and cooled by means of a Dry Ice-acetone bath. Ozone was passed into the cooled solution at a rate of 26 milligrams per minute until two moles of ozone per mole of adduct had been added. After completion of the ozonization 100 milliliters of glacial acetic acid was added and the methylene dichloride was then removed by fractional distillation under reduced pressure. After the addition of ten milliliters of 30 percent hydrogen peroxide to the glacial acetic acid solution of the ozonide it was warmed to about 80 degrees centigrade for one hour. The solution was then poured into 500 milliliters of water, the resulting precipitate collected, washed with water, dried and warmed with acetic anhydride. The acetic anhydride solution was poured into water and the resulting precipitate collected and dissolved in 200 milliliters of ether. The ether solution was extracted with an ice-cold saturated solution of barium hydroxide in water. A water-insoluble barium salt formed which was removed by filtration, suspended in 500 milliliters of water and acidified with dilute hydrochloric acid. The free acid extracted with ether, the ether solution washed with water, dried and the ether removed. The residue was heated under reflux with acetic anhydride, the solution poured into water and the precipitate collected. The crude product was crystallized first from methanol, then a mixture of ethyl acetate and hexane and finally from benzene. The maleic anhydride adduct of 3(beta)-acetoxy-bisnor-5,7,9-cholatrienic acid thus purified melted at 177–185 degrees centigrade.

*Example 2.—Maleic anhydride adduct of 3(beta)-acetoxy-bisnor-5,7,9-cholatrienic acid*

A solution of 30.0 grams (0.056 mole) of the 5,8-maleic anhydride adduct of dehydroergosteryl acetate in 600 milliliters of methylene chloride was cooled to minus 78 degrees centigrade and maintained at that temperature while 3.544 grams of ozone (1.3 moles per mole of adduct) was passed through over a period of three hours. The reaction mixture was diluted with 500 milliliters of glacial acetic acid and the methylene chloride was fractionally distilled in vacuo. An additional 200 milliliters of acetic acid was added, the solution was cooled to 15 degrees centigrade and the ozonide was decomposed by adding 44 grams of zinc dust, in portions, with mechanical stirring. The temperature was kept between 15 and 20 degrees centigrade. This required thirty minutes. One milliliter of one percent silver nitrate solution was added, and stirring was continued for twenty minutes until a test for peroxide with starch-iodide paper was negative. The zinc was separated by filtration and washed with acetic acid.

The combined acetic acid solution was then cooled to 18 degrees centigrade and stirred mechanically while being treated with a solution of chromic acid (11.2 grams in ten milliliters of water and thirty milliliters of acetic acid) for a period of three and one-half hours. The excess chromic acid was destroyed by the addition of 15 milliliters of methanol and two grams of sodium bisulfite, and the reaction mixture was poured into two liters of water. The product precipitated was separated by filtration and washed with water. Yield 22.1 grams (82 percent) of the 5,8-maleic anhydride adduct of 3(beta)-acetoxy-bisnor-5,7,9-cholatrienic acid, melting point 226–237 degrees centigrade. Recrystallization from methanol and from ether-hexane gave 11.1 grams (55 percent) of purified product, melting point 239.5–243 degrees centigrade. Its percentage analysis was as follows:

Calculated for $C_{28}H_{34}O_7$ _____ C, 69.69  H, 7.10
Found _____ 69.73     7.17

*Example 3.—Maleic anhydride adduct of 3(beta)-acetoxy-bisnor-5,7,9-cholatrienic acid*

Five and thirty-five hundredths grams of the maleic anhydride adduct of dehydroergosteryl acetate was suspended by stirring in 120 milliliters of glacial acetic acid. The temperature of the reaction mixture was maintained at plus 20 degrees centigrade while two molecular equivalents of ozone were passed into the suspension, the adduct going into solution. The temperature was then reduced to 15 degrees centigrade and eight grams of zinc dust added portionwise with stirring over a period of ten minutes, the temperature of the reaction mixture being maintained at 15 degrees centigrade. The stirring was continued and ten minutes after the addition of the zinc dust one milliliter of a one percent solution of silver nitrate was added. One hour later the solution gave a negative test for peroxide with starch-potassium iodide paper. A precipitate which had formed was separated by filtration and washed with glacial acetic acid. The combined acetic acid solutions were poured into water, the resulting precipitate of the crude maleic anhydride adduct of 3-acetoxy-bisnor-5,7,9-cholatrienic acid was purified as in Example 2 and dried; it had a melting point of 239–243 degrees centigrade.

*Example 4.—Maleic acid adduct of 3(beta)-hydroxy-bisnor-5,7,9-cholatrienic acid*

Nine hundred milligrams of the maleic anhydride adduct of 3(beta)-acetoxy-bisnor-5,7,9-cholatrienic acid (prepared by either of the methods described in Examples 1, 2, or 3) was dissolved in a minimum of methanol. A twenty percent excess of potassium hydroxide dissolved in five milliliters of methanol was added and the reaction mixture heated on the steam bath for one hour. After cooling to room temperature, ten percent hydrochloric acid was added dropwise to the methanolic solution until it became just acid to litmus. The acidic solution was then diluted with 25 milliliters of saturated sodium chloride solution and the resulting heavy white precipitate was extracted with five separate 25-milliliter portions of ether. The combined ether extracts were washed free from acid with saturated sodium chloride solution, dried over anhydrous sodium sulfate, filtered and concentrated to 75 milliliters. Upon cooling the solution, shiny crystals of the maleic acid adduct of 3(beta)-hydroxy-bisnor-5,7,9-cholatrienic acid formed, which, when recovered by filtration and dried, melted at 221–225 degrees centigrade. Total yield of product was 77.5 percent.

*Example 5.—Trimethyl ester of the maleic acid adduct of 3(beta)-hydroxy-bisnor-5,7,9-cholatrienic acid*

An excess of diazomethane in methylene chloride solution was allowed to react for sixteen hours at room temperature with 640 milligrams of the maleic acid adduct of 3(beta)-hydroxy-bisnor-5,7,9-cholatrienic acid (prepared as described in Example 4). The solution was filtered and concentrated to ten milliliters on the steam bath. Shiny platelets formed. After three crystallizations from methanol and one from acetone, these platelets of the trimethyl ester of the maleic acid adduct of 3(beta)-hydroxy-bisnor-5,7,9-cholatrienic acid had a melting point of 222–227 degrees centigrade. The percentage analysis was as follows:

Calculated for $C_{29}H_{40}O_7$ _____ C, 69.57  H, 8.05
Found _____ 69.81     8.32

*Example 6.—Trimethyl ester of the maleic acid adduct of 3(beta)-acetoxy-bisnor-5,7,9-cholatrienic acid*

A solution of 500 milligrams of the trimethyl ester of the maleic acid adduct of 3(beta)-hydroxy-5,7,9-cholatrienic acid (prepared as described in Example 5) in twenty milliliters of acetic anhydride was boiled for one-half hour and poured into 100 milliliters of a water-ice mixture. The resulting oil was washed with water, the water decanted and the residual oil scratched until it solidified. The trimethyl ester of the maleic acid adduct of 3(beta)-acetoxy-bisnor-5,7,9-cholatrienic acid thus obtained was collected, washed free of acetic acid with water, and recrystallized twice from a mixture of three parts of ether and one part of hexane. The recrystallized product melted at 192.5–195 degrees centigrade, and its percentage analysis was as follows:

Calculated -- C, 68.61 H, 7.80 CH₃CO, 9.05
Found ------ 68.69 7.75 8.14±1%

*Example 7.—Trimethyl ester of the maleic acid adduct of 3(beta)-benzoyloxy-bisnor-5,7,9-cholatrienic acid*

To 500 milligrams of the hydroxytrimethyl ester from Example 5 dissolved in two milliliters of pyridine was added 0.25 milliliter of benzoyl chloride dissolved in three milliliters of pyridine and the solution was allowed to stand overnight at room temperature. The reaction mixture was then poured into ice water and the precipitated benzoate separated by filtration. Several crystallizations from methanol gave 350 milligrams of the trimethyl ester of the maleic acid adduct of 3(beta) - benzoyloxy - bisnor-5,7,9-cholatrienic acid, melting point 201–203 degrees centigrade.

*Example 8.—Maleic anhydride adduct of methyl 3(beta)-acetoxy-bisnor-5,7,9-cholatrienate*

Ten milliliters of diazomethane dissolved in methylene dichloride was added to a suspension of one gram of the maleic anhydride adduct of 3(beta)-acetoxy - bisnor - cholatrienic acid (prepared as described in either Examples 1, 2 or 3) in ten milliliters of ether under room conditions and allowed to stand for an additional fifteen minutes. After removal of the excess diazomethane by distillation, the residual ether solution was filtered and cooled. There was thus obtained 0.82 gram of the methyl ester of the maleic anhydride adduct of 3(beta)-acetoxy-bisnor-5,7,9-cholatrienic acid melting at 242–244.5 degrees centigrade. Crystallization from a mixture of methylene dichloride and ether raised the melting point to 245–247.5 degrees centigrade. The product had the following percentage analysis:

Calculated for C₂₉H₃₆O₇ -------- C, 70.14 H, 7.31
Found ---------------------- 69.98 7.48

*Example 9.—Trimethyl ester of the maleic acid adduct of 3-lauroyloxy-bisnor - 5,7,9 - cholatrienic acid*

To 0.34 gram of the trimethyl ester of the maleic acid adduct of 3(beta)-hydroxy-bisnor-5,7,9-cholatrienic acid (prepared as described in Example 5), dissolved in 3.0 milliliters of pyridine was added 0.32 milliliter of lauroyl chloride. The reaction mixture was allowed to stand overnight at room temperature and then poured into ice water. The precipitate which formed was removed. After crystallization from methanol, the crystals of the trimethyl ester of the maleic acid adduct of 3-lauroyl-bisnor-5,7,9-cholatrienic acid melted at 113.5–115 degrees centigrade. The yield was 0.12 gram and the percentage analysis of the product was as follows:

Calculated ---------------- C, 72.10 H, 9.15
Found ---------------- 72.24 8.94

*Example 10.—Trimethyl ester of the maleic acid adduct of 3(beta)-phenylacetoxy-bisnor-5,7,9-cholatrienic acid*

A solution of 490 milligrams of the trimethyl ester of the maleic acid adduct of 3(beta)-hydroxy-bisnor-5,7,9-cholatrienic acid (prepared as described in Example 5) and 0.27 milliliter of phenylacetyl chloride in six milliliters of pyridine was heated to about 90 degrees centigrade for twenty minutes, after which it was allowed to stand overnight at prevailing room conditions. The solution was then poured into water, the precipitate separated, washed with water and dried. It weighed 430 milligrams.

Repeated crystallization of the product from a mixture of acetone and water followed by final crystallization from acetone gave the trimethyl ester of the maleic acid adduct of 3(beta)-phenylacetoxy-bisnor-5,7,9-cholatrienic acid melting at 238–241 degrees centigrade.

*Example 11.—Maleic anhydride adduct of 3-heptanoyloxy-bisnor-5,7,9-cholatrienic acid*

One gram of 3-acetoxy-bisnor-5,7,9-cholatrienic acid-maleic anhydride adduct was saponified as described in Example 4. The resulting crude 3-hydroxy-bisnor-5,7,9-cholatrienic acid-maleic acid adduct was dissolved in 30 milliliters of warm heptylic anhydride (heptanoic or oenanthylic anhydride) and 12 milliliters of pyridine. The reaction mixture was then heated under reflux for ten minutes, the temperature of the mixture rising to 130 degrees centigrade. The heat was removed and the reaction mixture allowed to stand for an additional one and one-quarter hours. After the excess anhydride and pyridine had been removed by distillation under reduced pressure the residue was poured into ice water. The aqueous suspension was extracted with ether, the ether removed and the residue crystallized from cyclohexane. There was obtained 0.42 gram of the maleic anhydride adduct of 3-heptanoyloxy-bisnor-5,7,9-cholatrienic acid melting at 209–211 degrees centigrade. Its percentage analysis was as follows:

Calculated ----------------- C, 71.71 H, 8.07
Found --------------------- 71.41 8.07

*Example 12.—Trimethyl ester of 3-isovaleroyloxy-bisnor-5,7,9-cholatrienic acid-maleic acid adduct*

To 0.4 gram of the trimethyl ester of 3-hydroxy-bisnor-5,7,9-cholatrienic acid-maleic acid adduct, prepared as described in Example 5, dissolved in four milliliters of pyridine was added 0.23 milliliter of isovaleryl chloride. The reaction mixture was allowed to stand overnight at room temperature and then poured into ice water. The precipitate which formed was removed and after crystallization from dilute methanol there was obtained 0.14 gram of the trimethyl ester of 3-isovaleroyloxy - bisnor - 5,7,9 - cholatrienic acid-maleic acid adduct melting at 148–154 degrees centigrade.

*Example 13.—Benzoate of dehydroergosterol-dimethyl maleate adduct*

To 21.7 grams of the adduct of dehydroergosterol and dimethyl maleate dissolved in 69 milliliters of warm pyridine was added 9.5 milliliters of benzoyl chloride. The reaction mixture was allowed to stand overnight at room temperature and then poured into ice water. The precipitate which formed was removed and a 0.5-gram portion, after crystallization from chloroform-methanol, gave 0.45 gram of the benzoate of dehydroergosterol-dimethyl maleate adduct melting at 203–205.5 degrees centigrade $[\alpha] \cdot D^{25} + 69.9$ degrees Its percentage analysis was as follows:

Calculated _____ C, 76.60  H, 8.47
Found _____    76.51     8.21

Inasmuch as the foregoing description comprises preferred embodiments of my invention it is to be understood that the invention is not limited thereto and that modifications and variations may be made therein without departing substantially from its purview or the scope of the appended claims.

I claim:

1. A compound of the group consisting of (a) bisnor-cholatrienic acid adducts represented by the general formula:

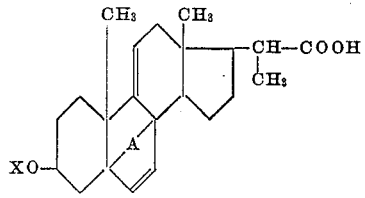

wherein X is a member of the group consisting of hydrogen, lower fatty acid acyl radicals, and phenyl-substituted lower fatty acid acyl radicals, wherein A is the adduct radical of a dienophile selected from the group consisting of maleic acid, maleic anhydride, and lower-alkyl diesters of maleic acid, and (b) lower-alkyl esters of the said bisnorcholatrienic acid adducts.

2. The 5,8 maleic anhydride adduct of 3-acetoxy-bisnor-5,7,9-cholatrienic acid.

3. The 5,8, dimethyl maleate adduct of methyl 3-acetoxy-bisnor-5,7,9-cholatrienate.

4. The 5,8 maleic acid adduct of 3-hydroxy-bisnor-5,7,9-cholatrienic acid.

5. The 5,8 dimethyl maleate adduct of methyl 3-benzoyloxy-bisnor-5,7,9-cholatrienate.

6. The 5,8 dimethyl maleate adduct of methyl 3-lauroyloxy-bisnor-5,7,9-cholatrienate.

7. A process for the preparation of a cholatrienic acid 5,8 adduct having the general formula:

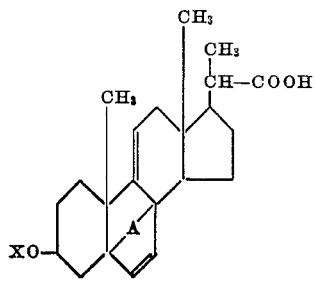

wherein X is selected from the group consisting of lower fatty acid acyl radicals and phenyl-substituted lower fatty acid acyl radicals, wherein A represents the adduct radical of a dienophile selected from the group consisting of maleic acid, maleic anhydride, and lower-alkyl maleic acid diesters, comprising: ozonizing, in solution, a dehydroergosterol adduct having the general formula:

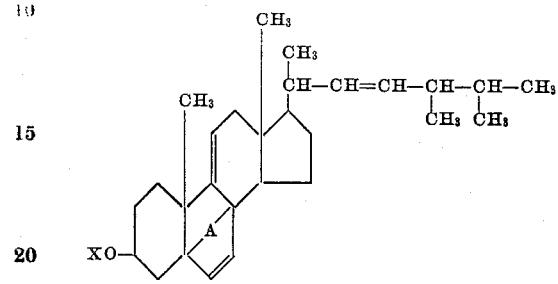

wherein X and A have the foregoing significance, with from about 1.25 to 2.5 moles of ozone per mole of adduct, at a temperature between about +25 and −70 degrees centigrade, decomposing the ozonide thus formed in the presence of an oxidizing agent, and recovering the resulting acid.

8. The method as defined in claim 7, wherein the oxidizing agent is hydrogen peroxide.

9. The method as defined in claim 7, wherein the temperature during ozonization is maintained between plus 20 and minus 30 degrees centigrade.

10. The method as defined in claim 7, wherein the solvent is methylene dichloride.

11. A method for the preparation of 3-acetoxy-bisnor-5,7,9-cholatrienic acid-5,8-maleic anhydride adduct comprising ozonizing a methylene dichloride solution of the 5,8-maleic anhydride adduct of 3-acetoxy-dehydroergosterol with from 1.25 to 2.5 moles of ozone per mole of adduct at a temperature of about twenty degrees centigrade, decomposing the ozonide in the presence of an oxidizing agent and recovering the resulting maleic anhydride adduct of 3-acetoxy-bisnor-5,7,9-cholatrienic acid.

ROBERT H. LEVIN.

REFERENCES CITED

The following references are of record in the file of this patent:

Inhoffen, Annalen, vol. 508 (1934), pp. 81–88.
Honigmann, Annalen, vol. 508 (1934), pp. 88–104.